(12) United States Patent
Engelhardt et al.

(10) Patent No.: US 8,400,004 B2
(45) Date of Patent: Mar. 19, 2013

(54) METHOD FOR OPERATING A WIND TURBINE

(75) Inventors: Stephan Engelhardt, Sonsbeck (DE); Andrzej Geniusz, Mulheim an der Ruhr (DE)

(73) Assignee: Woodward Kempen GmbH, Kempen (DE)

( * ) Notice: Subject to any disclaimer, the term of this patent is extended or adjusted under 35 U.S.C. 154(b) by 365 days.

(21) Appl. No.: 12/864,839

(22) PCT Filed: Jan. 28, 2009

(86) PCT No.: PCT/EP2009/050952
§ 371 (c)(1), (2), (4) Date: Sep. 28, 2010

(87) PCT Pub. No.: WO2009/095412
PCT Pub. Date: Aug. 6, 2009

(65) Prior Publication Data
US 2011/0006528 A1 Jan. 13, 2011

(30) Foreign Application Priority Data
Feb. 1, 2008 (DE) .......................... 10 2008 007 448

(51) Int. Cl.
*F03D 9/00* (2006.01)
*H02P 9/04* (2006.01)
(52) U.S. Cl. .......................................... 290/44; 290/55
(58) Field of Classification Search .................... 290/44, 290/55
See application file for complete search history.

(56) References Cited

U.S. PATENT DOCUMENTS

| 5,225,712 A | * | 7/1993 | Erdman | 290/44 |
| 6,566,764 B2 | * | 5/2003 | Rebsdorf et al. | 290/44 |
| 6,856,038 B2 | * | 2/2005 | Rebsdorf et al. | 290/44 |
| 7,180,270 B2 | * | 2/2007 | Rufer et al. | 322/20 |

(Continued)

FOREIGN PATENT DOCUMENTS

| DE | 10019362 A1 | 10/2001 |
| DE | 101 38 399 A1 | 2/2003 |

(Continued)

OTHER PUBLICATIONS

Iwanski, G.; Koczara, W. "Grid Connection to Stand Alone Transitions of Slip Ring Induction Generator During Grid Faults" in Power Electronics and Motion Control Conference, 2006. IPEMC '06. CES/IEEE 5th International, vol. 1, Aug. 2006, pp. 1-5.

*Primary Examiner* — Pedro J Cuevas
(74) *Attorney, Agent, or Firm* — Rankin, Hill & Clark LLP

(57) ABSTRACT

A method for operating a wind turbine that includes a generator device for outputting electric energy to a network, the generator device having a stator, and a controller device for controlling the generator device. To ensure sufficient protection of the wind turbine even during network fluctuations, a network voltage is determined using a network model at least as a function of a stator voltage measured with a first measuring apparatus and a network power measured with a second measuring apparatus, and the determined network voltage and a predeterminable maximum phase angle present between the stator voltage and network voltage are used to determine the maximum effective power of the wind turbine that can be output, and the output effective power is regulated as a function of the determined maximum effective power that can be output and a target effective power predetermined by the control device.

13 Claims, 3 Drawing Sheets

U.S. PATENT DOCUMENTS

Figure 1:
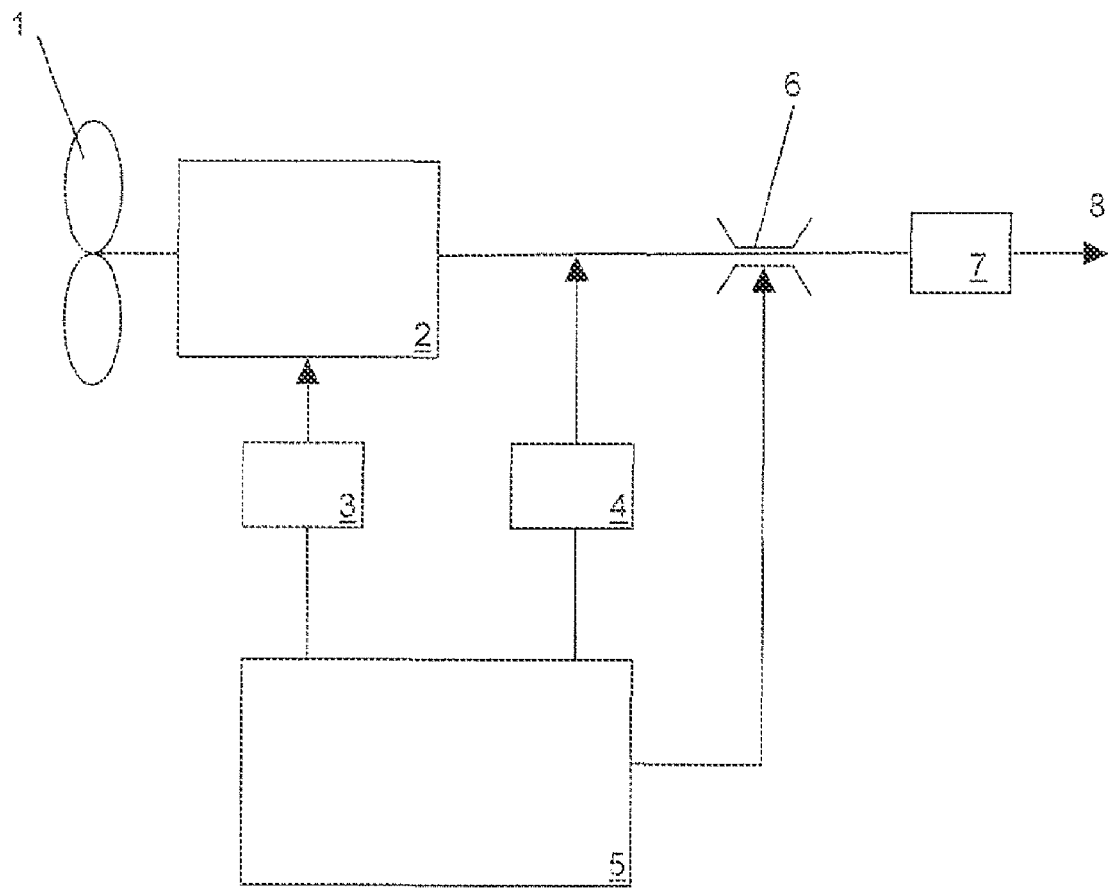

| | | | |
|---|---|---|---|
| 7,423,406 B2* | 9/2008 | Geniusz | 318/800 |
| 7,595,563 B2 | 9/2009 | Wobben | 290/44 |
| 7,638,983 B2* | 12/2009 | Park et al. | 322/20 |
| 8,046,109 B2* | 10/2011 | Larsen et al. | 700/293 |
| 8,093,740 B2* | 1/2012 | Oohara et al. | 290/44 |
| 8,198,742 B2* | 6/2012 | Jorgensen et al. | 290/44 |
| 8,242,753 B2* | 8/2012 | Engelhardt et al. | 322/20 |
| 8,264,209 B2* | 9/2012 | Kretschmann | 322/25 |
| 2002/0079706 A1* | 6/2002 | Rebsdorf et al. | 290/55 |
| 2003/0151259 A1 | 8/2003 | Feddersen et al. | 290/44 |
| 2004/0026929 A1* | 2/2004 | Rebsdorf et al. | 290/44 |
| 2005/0042098 A1 | 2/2005 | Wobben | 416/132 B |
| 2007/0052394 A1* | 3/2007 | Geniusz | 323/205 |
| 2008/0088131 A1* | 4/2008 | Thisted | 290/44 |
| 2008/0150285 A1* | 6/2008 | Corcelles Pereira et al. | 290/44 |
| 2008/0277938 A1* | 11/2008 | Oohara et al. | 290/44 |
| 2009/0206606 A1* | 8/2009 | Jorgensen et al. | 290/44 |
| 2009/0261589 A1* | 10/2009 | Oohara et al. | 290/44 |
| 2009/0267572 A1* | 10/2009 | Engelhardt et al. | 322/61 |
| 2010/0277134 A1* | 11/2010 | Engelhardt et al. | 322/32 |
| 2011/0018270 A1* | 1/2011 | Corcelles Pereira et al. | 290/44 |
| 2011/0074365 A1* | 3/2011 | Nakayama et al. | 322/27 |
| 2011/0106470 A1* | 5/2011 | Yin et al. | 702/58 |
| 2011/0137474 A1* | 6/2011 | Larsen et al. | 700/287 |
| 2011/0153092 A1* | 6/2011 | Engelhardt et al. | 700/280 |
| 2011/0210553 A1* | 9/2011 | Engelhardt et al. | 290/44 |
| 2011/0215775 A1* | 9/2011 | Engelhardt et al. | 323/205 |
| 2011/0260454 A1* | 10/2011 | Engelhardt et al. | 290/44 |
| 2012/0211983 A1* | 8/2012 | Tripathi et al. | 290/44 |

FOREIGN PATENT DOCUMENTS

EP  1040564 B1  10/2000

* cited by examiner

METHOD FOR OPERATING A WIND TURBINE

The invention relates to a method for operating a wind energy plant having a generator device for outputting electrical energy to a grid, wherein the generator device comprises a stator, and having a control device for controlling the generator device, wherein a stator voltage of the generator device is measured at least with one first measuring device, and a grid current output to the grid is measured at least with one second measuring device. In addition, the invention relates to a computer program and to a computer program product for carrying out the method by using a processor and to a control device of a generator device of a wind energy plant and to a wind energy plant.

There is a constant desire to optimise the output of effective power of a wind energy plant to a grid and to prevent both the grid and the wind energy plant from being impaired. In particular, in the case of a voltage dip the effective power output by the wind energy plant can exceed the maximum effective power that can be output to the grid. This can lead to the generator device of the wind energy plant becoming unstable. If the generator device becomes unstable this results in that the wind energy plant has to be switched off in order to prevent the wind energy plant from being damaged.

A method is known from publication EP 1 040 564 B1 for operating a wind energy plant to prevent unwanted changes in the grid voltage, so that an otherwise necessary deactivation of the wind energy plant is avoided. In this connection, the wind energy plant comprises a voltage sensor for recording an electrical voltage present on an electrical grid. If the grid voltage is greater or less than a pre-determined grid voltage value the wind energy plant can be operated without outputting power to the electrical grid. The disadvantage of this method for operating a wind energy plant, however, is that this method is designed for protecting the grid, but not for protecting the wind energy plant. It is also desirable to be able to operate the wind energy plant even with large changes in the grid voltage without having to stop outputting power and, at the same time, to be able to guarantee sufficient protection of the wind energy plant.

Taking this prior art as the starting point, the object of the present invention is to provide a generic method for operating a wind energy plant which guarantees that the wind energy plant is reliably operated when there are fluctuations in the grid voltage and, at the same time, enables the wind energy plant to be reliably protected against damage without having to switch off the wind energy plant.

The above mentioned object is achieved, according to a first teaching of the present invention, by a generic method in that a grid voltage is determined using a grid model at least as a function of the stator voltage and the grid current, the maximum effective power of the wind energy plant that can be output is determined from the determined grid voltage and a pre-determinable maximum phase angle existing between stator voltage and grid voltage, and the output effective power is controlled as a function of the determined maximum effective power that can be output and a target effective power pre-determined by the control device.

In contrast to known methods, the aim of the method according to the invention is to protect the wind energy plant by preventing unstable states from occurring in the wind energy plant. By determining the grid voltage and by means of the pre-determinable maximum phase angle existing between stator voltage and grid voltage the maximum effective power that can be output to a grid by the generator device can be determined, which still enables the wind energy plant to be operated stably. Consequently, the effective power actually output can be regulated as a function of the maximum effective power that can be output and critical operating situations can be prevented without the wind energy plant having to be deactivated or no-load operation being necessary.

According to a first embodiment according to the invention, the determined maximum effective power that can be output can be compared to the pre-determined target effective power and when the maximum effective power that can be output is exceeded by the target effective power the target effective power is restricted to the maximum effective power that can be output. Otherwise, the target effective power is output to the grid. It has been discovered that unstable operating situations caused by a fall in voltage in the grid can be particularly easily prevented if the output target effective power is restricted in case of a smaller maximum effective power that can be output to the maximum effective power that can be output. By reducing the effective power actually output, an unwanted acceleration of the generator device can be prevented. Furthermore, the wind energy plant can be operated in a stable operating point and deactivation of the wind energy plant can be prevented.

Moreover, according to another exemplary embodiment of the present invention, the maximum effective power that can be output can be determined continuously, periodically and/or once. With grids whose output is almost constant and a voltage dip seems unlikely, the maximum effective power that can be output can be determined once, for example when bringing the wind energy plant into service. The computing time required for determining the maximum effective power that can be output can hereby be reduced. Higher safety can be obtained by determining the maximum effective power that can be output periodically or, if necessary, continuously in order to also react appropriately to relatively sudden dips in voltage and in particular in order to be able to restrict the output target effective power sufficiently quickly to the maximum effective power that can be output.

According to a subsequent embodiment of the method according to the invention, the grid voltage used for determining the maximum effective power that can be output can be calculated from the stator voltage, the grid current and a grid impedance. The grid voltage can be determined easily by using these parameters for determining the grid voltage without having to measure the otherwise necessary grid voltage, which would involve a lot of time and effort.

In order to obtain exact grid impedance values, the grid impedance can be calculated from at least two stator voltages measured at different points in time and from at least two grid currents measured at different points in time. The grid impedance, comprising a real and an imaginary part, can be determined easily by means of two measurements both of the stator voltage and of the grid current from the two equations resulting therefrom. Suitable measuring devices for measuring and suitable processing means for determining the grid impedance can be provided in the control device.

The grid impedance can be determined continuously, periodically and/or once. In grids which have an almost constant grid impedance without significant changes, in particular, the grid impedance can be determined once to reduce calculation time, for example when bringing the wind energy plant into service. For grids in which the grid impedance can vary, it can be advantageous to determine the grid impedance periodically, and with quickly changing grid impedances even continuously, in order to incorporate change in the grid impedances into the calculation of the maximum effective power that can be output. The exactness of the grid model and of determining the parameters based on the grid model can be improved accompanied by an improvement in the safety of the wind energy plant.

It has been discovered that the installation can be sufficiently protected by selecting the maximal phase angle between the stator voltage and the grid voltage appropriately. According to a subsequent embodiment of the method according to the invention, the maximum phase angle between the stator voltage and the grid voltage can be set to less than or equal to 85°, preferably less than or equal to 70°. The phase angle required for the theoretically maximum effective power that can be output, and the maximum possible, is 90°. However, in order to obtain sufficient safety margins with regard to operating the wind energy plant stably, which is only possible at phase angles of less than 90°, setting the phase angle to at least less than or equal to 85° is advantageous, wherein a maximum phase angle of less than or equal to 70° provides greater safety margins.

According to another exemplary embodiment of the present invention, a double-fed asynchronous machine can be used. Double-fed asynchronous machines are in particular suitable for use as the generator device in a wind energy plant.

According to a second teaching of the present invention, the above disclosed object is achieved by a computer program with commands, the execution of which causes a processor to carry out the method according to the invention. The same applies for a computer program product which contains a computer program with commands, the execution of which causes a processor to carry out the method according to the invention. Reference is made to the description of the method according to the invention regarding the advantages of the computer program or the computer program product according to the invention, respectively.

According to a further teaching of the present invention, the above disclosed object is achieved by a control device of a generator device of a wind energy plant, wherein the control device comprises means for controlling the effective power output from the generator device to a grid according to the method according to the invention. The control device according to the invention enables a wind energy plant generator device to be operated and prevents critical operating situations, in particular generator device instability and the necessary deactivation of the wind energy plant associated with this. Moreover, output of power can be guaranteed even with strong grid voltage fluctuations.

Finally, the same also applies for a wind energy plant comprising a generator device and a control device according to the invention. The wind energy plant according to the invention is particularly suitable for operating "weak" grids or with a weak grid connection. This applies, for example, to wind energy plants in offshore wind parks.

There are now many possibilities for developing and refining the method according to the invention, the control device and the wind energy plant. In this connection, reference is made to the claims subordinate to claim 1, on the one hand, and to the description of exemplary embodiments associated with the drawing, on the other hand. In the drawing FIG. 1 shows a schematic illustration of an exemplary embodiment of a wind energy plant according to the invention, FIG. 2 shows a flowchart of an exemplary embodiment according to the method according to the invention and FIG. 3 shows a power characteristic curve diagram of an exemplary embodiment according to the method according to the invention.

FIG. 1 firstly shows a schematic illustration of an exemplary embodiment of a wind energy plant according to the invention. The illustrated rotor 1 is provided to operate the generator device 2. A double-fed asynchronous machine can advantageously be used as the generator device 2. The generator device 2 can output effective power to a grid 8 with a grid impedance 7. The grid current output to the grid 8 can be determined by a second measuring device 4. Moreover, a stator voltage of the generator device 2 can be recorded by means of a first measuring device 3. The recorded values of both the stator voltage and the grid current output to the grid 8 can be transmitted in a suitable format, for example as analogue or digital data, to a control device 5. The control device 5 can have suitable means for processing the recorded data according to the present method, wherein in particular digital processing can be possible. Furthermore, the control device 5 is capable of actuating a limiter device 6, in order, if necessary, to restrict the effective power actually output.

Figure 2:
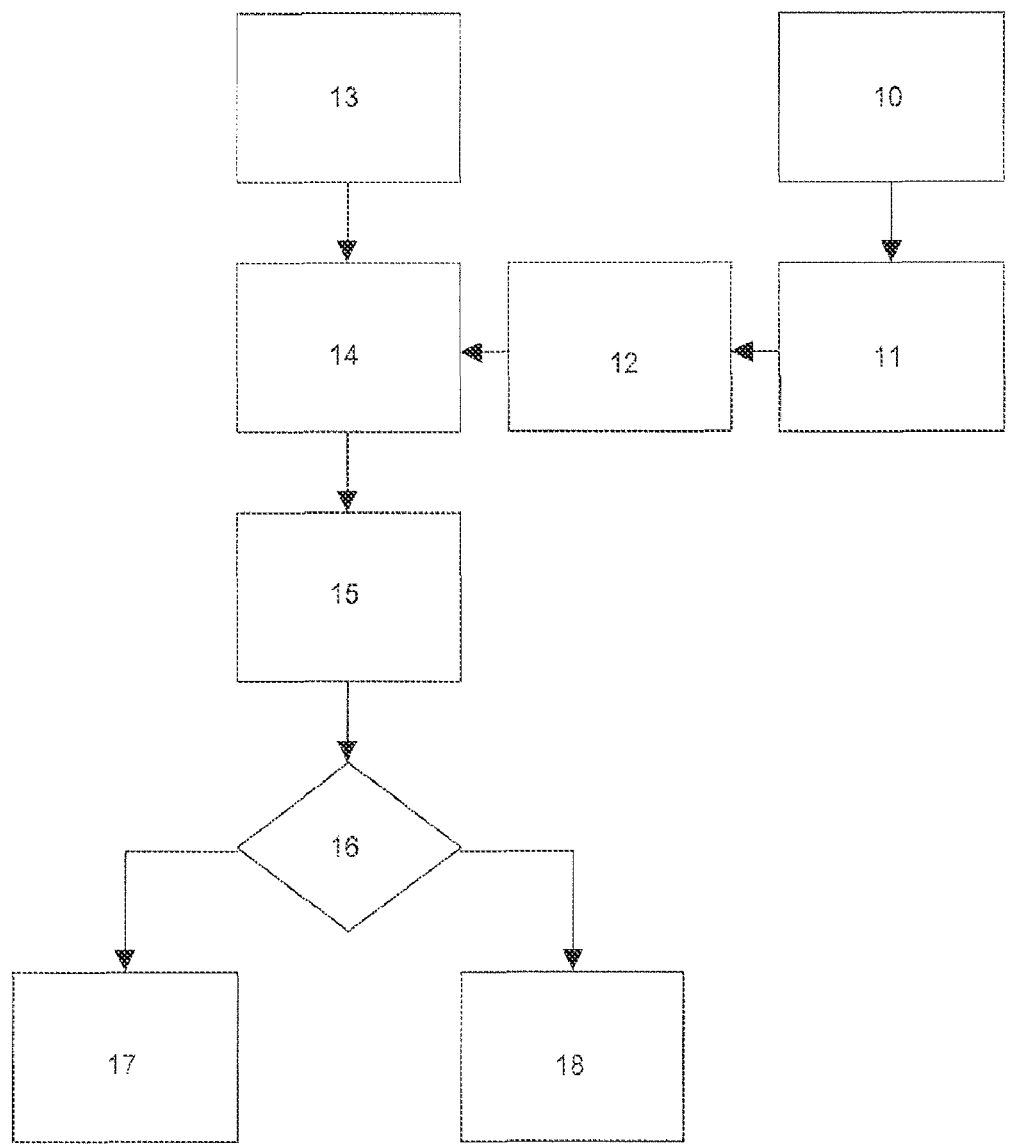
Figure 3:
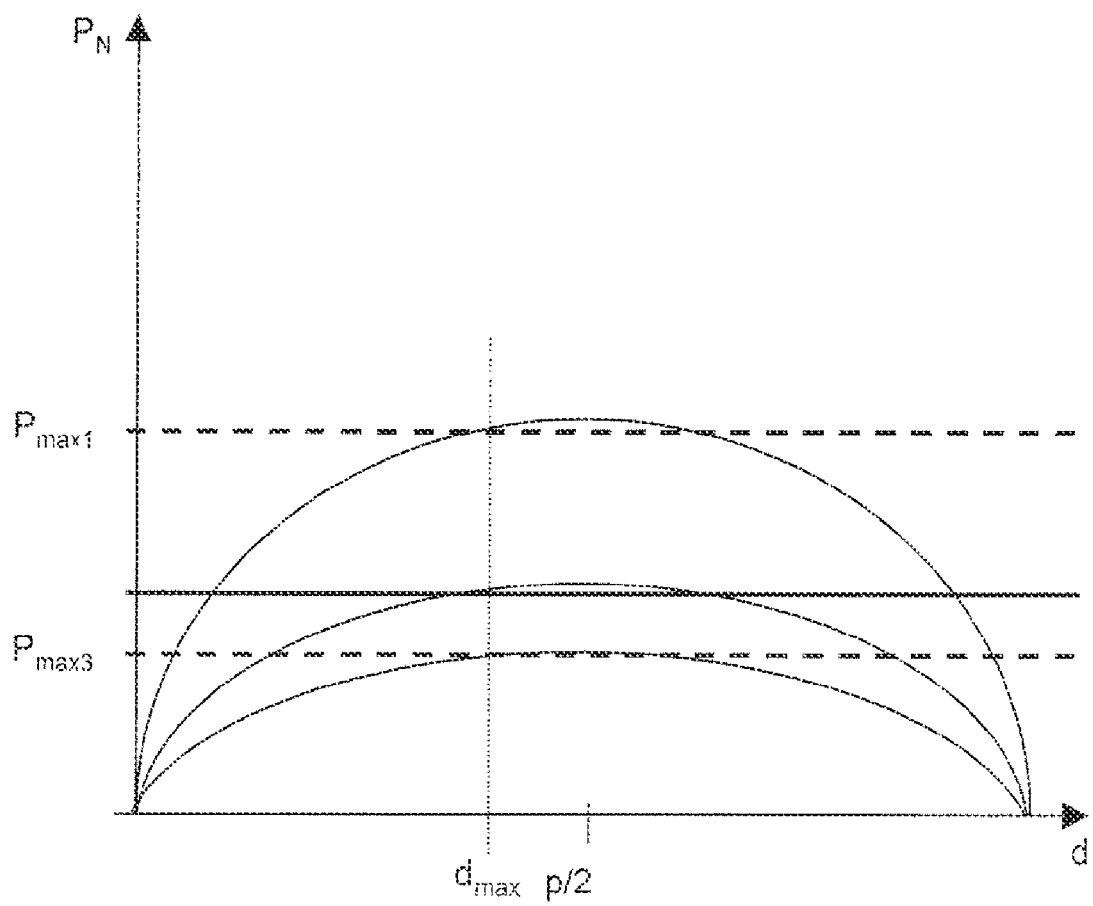

The functionality of an exemplary embodiment according to the method according to the invention is explained with the aid of the simplified flowchart illustrated in FIG. 2. To control the effective power actually output, parameters for a grid model must firstly be determined. It is also possible, however, to specify the grid impedance as a fixed value. In particular, firstly the grid impedance $Z_N$ can be determined. In a first step 10, the stator voltage $U_{S1}$ and the grid current $I_{N1}$ output to the grid 8 can be recorded by the measuring devices 3, 4 provided. These measurement values are recorded at a first operating time $t_1$. It shall be understood that this step can also be carried out in two separate steps. At a second operating time $t_2$, a second measurement of the stator voltage $U_{S2}$ and the output grid current $I_{N2}$ can be carried out in a second step 11 by the measuring devices 3, 4 provided. The recorded values can be transmitted to the control device 5 for further processing. In a next step 12, the sought-after variables $R_N$ and $X_N$ of the grid impedance $Z_N$ can be calculated using suitable processing means of the control device 5 as follows. If one takes the general equation $$U_Q = U_S - Z_N I_N, \text{ with } Z_N = R_N + jX_N \tag{a}$$

as a starting point for a source voltage $U_Q$, then one gets the following two equations for the two operating times $t_1$ and $t_2$ $$U_{Q1} = U_{S1} - (R_{N1} + jX_{N1})I_{N1}, \tag{b}$$

$$U_{Q2} = U_{S2} - (R_{N2} + jX_{N2})I_{N2}. \tag{c}$$

In addition, it can be assumed that the source voltage $U_Q$ is approximately constant within a sufficiently small period of time between the first operating time $t_1$ and the second operating time $t_2$ and consequently the components $R_N$ and $X_N$ also remain almost constant. Therefore, the above equations can be simplified and the equations $$U_Q = U_{S1} - (R_N + jX_N)I_{N1}, \tag{d}$$

$$U_Q = U_{S2} - (R_N + jX_N)I_{N2} \tag{e}$$

result.

By subtraction of the two equations (d) and (e) the equation $$0 = U_{S1} - U_{S2} - (R_N + jX_N)(I_{N1} - I_{N2}) \tag{f}$$

results.

By decomposing the equation (f) into real and imaginary parts one gets two equations from the equation (f) with two unknown values $R_N$ and $X_N$. By solving these equations the sought-after components $R_N$ and $X_N$ can be determined. The method steps 10 to 12 can be carried out once, for example when the wind energy plant is brought into service, particularly if it can be assumed that the grid impedance $Z_N$ will remain sufficiently constant. Moreover, it can be advantageous to also determine the grid impedance $Z_N$ periodically or continuously. Changes in the grid impedance $Z_N$ can be recorded and taken into consideration in the grid model, particularly immediately after their appearance. The calculations can be carried out with suitable processing means, such as a microprocessor or the like, in the control unit 5. It shall be understood that according to other variants of the invention the steps 10 to 12 can also be omitted and the grid impedance $Z_N$ can be definitely determined by estimating or deriving it from known grid impedance values from comparable grids.

If now the parameters $R_N$ and $X_N$ of the grid model are determined, in a step 13 the stator voltage $U_S$ and the output grid current $I_N$ can be recorded by the measuring devices 3, 4 provided. It is also possible that the already recorded measurement values are reverted to in order to determine the grid model. In the next step 14, the grid voltage $U_N$ is determined by the processing means provided in the control device 5 at least from the measured stator voltage $U_S$ and from the grid current $I_N$ output to the grid 8 using the grid model. In particular, the grid voltage $U_N$ can be calculated according to the following equation $$U_N = U_S - I_N(R_N + jX_N). \tag{g}$$

In the following step 15, the maximum effective power $P_{max}$ that can be output is determined. Generally, the effective power P that can be output to the grid 8 results from the equation $$P = |\underline{U}_N||\underline{U}_S|\frac{1}{|R_N + jX_N|}\sin(\delta), \tag{h}$$

wherein $\delta$ is the phase angle between the stator voltage $U_S$ and the grid voltage $U_N$. According to the invention, for reasons of safety, in particular to protect the wind energy plant when there are grid fluctuations, a maximum phase angle $\delta_{max}$ between the stator voltage $U_S$ and the grid voltage $U_N$ is pre-determined. Preferably, the maximum phase angle $\delta_{max}$ between the stator voltage $U_S$ and the grid voltage $U_N$ is smaller or equal to 85°, in particular smaller or equal to 70°, in order to provide more safety margins for control fluctuations.

To clarify the relationship between effective power P that can be output and phase angle $\delta$, an exemplary power characteristic curve diagram of an exemplary embodiment according to the method according to the invention is shown in FIG. 3. As becomes clear from the power characteristic curves from FIG. 3, the theoretically maximum effective power that can be output arises for a phase angle $\delta = \pi/2$ or 90°, respectively. Larger phase angles $\delta$, however, lead to an acceleration of the generator device 2 and thus to instability in the generator device 2. In such a case, the wind energy plant would have to be switched off in order to prevent damage to the wind energy plant. Consequently, larger phase angles $\delta$ should be avoided at all costs. By way of precaution, a safety margin with regard to the phase angle $\delta = \pi/2$ or 90°, respectively. should be maintained, wherein a maximum phase angle $\delta_{max}$ of 70° has proved to be particularly suitable.

Referring again to the flowchart illustrated in FIG. 2, the maximum effective power $P_{max}$ that can be output is calculated in step 15 according to the following equation by means of suitable processing means in the control device 5

$$P_{max} = |\underline{U}_N||\underline{U}_S|\frac{1}{|R_N + jX_N|}\sin(\delta_{max}). \tag{i}$$

The maximum effective power $P_{max}$ that can be output can be determined continuously, periodically and/or once. Here, the following can, for example, be taken into consideration: how high the probability of grid fluctuations is, how great these grid fluctuations could be, how great the available computing power is or whether the greatest possible protection of the wind energy plant is to be achieved.

In the subsequent step 16, the determined maximum effective power $P_{max}$ that can be output is compared to a target effective power $P_{set}$, which is pre-determined by the control device 5. The target effective power $P_{set}$ can, for example, be pre-determined subject to system requirements, such as the productive efficiency of the wind energy plant. Furthermore, the target effective power can be altered when the wind energy plant is operating, for example adjusted to the wind speed. Three different cases are possible in a comparison in step 16. The target effective power $P_{set}$ can be smaller than the maximum effective power $P_{max}$ that can be output, equal to the maximum effective power $P_{max}$ that can be output or greater than the maximum effective power $P_{max}$ that can be output.

The three cases are explained below with the aid of the power characteristic curves from FIG. 3. The first case considered is the one in which the maximum effective power $P_{max1}$ that can be output has been determined as a function of the maximum phase angle $\delta_{max}$. As can be gathered from FIG. 3, the maximum effective power $P_{max1}$ that can be output is greater than the pre-determined target effective power $P_{set}$. In this case, the target effective power $P_{set}$ is output to the grid 8 by the generator device 2 (step 17).

For the case where the determined maximum effective power $P_{max2}$ that can be output is equal to the pre-determined target effective power $P_{set}$, then step 17 can also be proceeded with. The target effective power $P_{set}$ is also in this case output to the grid 8.

In the third case, the determined maximum effective power $P_{max3}$ that can be output is smaller than the pre-determined target effective power $P_{set}$. This case can, for example, occur through a fall in voltage in the grid 8. If, in this case, the generator device 2 tried to output the target effective power $P_{set}$ to the grid 8, then the generator device 2 could become unstable and it could be necessary to switch the generator device 2 off, in order to prevent damage to the wind energy plant. In order to prevent these effects, the effective power P that can be output is restricted to the maximum effective power $P_{max3}$ that can be output (step 18). For example, the control device 5 can correspondingly actuate the limiting device 6 and restrict the effective power P actually output to the maximum effective power $P_{max3}$ that can be output. It shall be understood here that the effective power P actually output can be adjusted to the target effective power $P_{set}$ again when the maximum effective power $P_{max}$ that can be output has risen at least to the target effective power $P_{set}$ again.

The invention claimed is:

1. A method for operating a wind energy plant having a generator device for outputting electrical energy to a grid, wherein the generator device comprises a stator, and having a control device for controlling the generator device, wherein a stator voltage of the generator device is measured at least with one first measuring device, and a grid current output to the grid is measured at least with one second measuring device, wherein a grid voltage is determined using a grid model at least as a function of the stator voltage and the grid current, the maximum effective power of the wind energy plant that can be output is determined from the determined grid voltage and a pre-determinable maximum phase angle existing between stator voltage and grid voltage, and the output effective power is controlled as a function of the determined maximum effective power that can be output and a target effective power pre-determined by the control device.

2. The method according to claim 1, wherein the determined maximum effective power that can be output is compared to the pre-determined target effective power and when the maximum effective power that can be output is exceeded by the target effective power the target effective power is restricted to the maximum effective power that can be output.

3. The method according to claim 1, wherein the maximum effective power that can be output is determined continuously, periodically or once.

4. The method according to claim 1, wherein the grid voltage is calculated from the stator voltage, the grid current and a grid impedance.

5. The method according to claim 4, wherein the grid impedance is calculated from at least two stator voltages measured at different points in time and from at least two grid currents measured at different points in time.

6. The method according to claim 5, wherein the grid impedance is determined continuously, periodically or once.

7. The method according to claim 1, wherein the maximum phase angle ($\delta_{max}$) between the stator voltage and the grid voltage is set to less than or equal to 85°.

8. The method according to claim 1, wherein a double-fed asynchronous machine is used.

9. A computer program with commands, the execution of which causes a processor to carry out the method according to claim 1.

10. A computer program product which contains a computer program with commands, the execution of which causes a processor to carry out the method according to claim 1.

11. A control device of a generator device of a wind energy plant, wherein the control device comprises means for controlling the effective power output from the generator device to a grid according to a method according to claim 1.

12. A wind energy plant comprising a generator device and a control device according to claim 11.

13. The method according to claim 1, wherein the maximum phase angle ($\delta_{max}$) between the stator voltage and the grid voltage is set to less than or equal to 70°.

* * * * *